M. NYSTROM.
TALKING MACHINE.
APPLICATION FILED JUNE 1, 1915.

1,262,592.

Patented Apr. 9, 1918.

Witness:
Peter Jongedyk.

Inventor:
Martin Nystrom
By Richd J. Jacker
Atty.

UNITED STATES PATENT OFFICE.

MARTIN NYSTROM, OF CHICAGO, ILLINOIS, ASSIGNOR, BY MESNE ASSIGNMENTS, TO CHARLES E. OSBORNE, OF CHICAGO, ILLINOIS.

TALKING-MACHINE.

1,262,592.          Specification of Letters Patent.          Patented Apr. 9, 1918.

Application filed June 1, 1915. Serial No. 31,603.

*To all whom it may concern:*

Be it known that I, MARTIN NYSTROM, a citizen of the United States, residing at Chicago, in the county of Cook and State of Illinois, have invented a new and useful Improvement in Talking-Machines, of which the following is a specification.

My invention relates to talking machines in which a diaphragm is caused to vibrate by the tracking of a needle or point upon a record, and the objects of my improvements are first, to reproduce the recorded vibrations accurately and correctly; second, to provide a plurality of tracker devices in connection with the diaphragm to enable the use of different records, third, to enable using different kinds of records without in any way making a change in the machine; fourth, to make a simple, cheap and efficient device and other features to become apparent from the description to follow.

There are two known talking machine records on the market. One has the indentations representing the sound record arranged laterally or zig-zag from side to side with relation to the line of travel of the needle, and the other has such indentations arranged up and down or longitudinally with relation to the longitudinal axis of the tracker point; therefore it is necessary to have one kind or style of machine to play or use the one kind of record and to have another kind or style of machine to play or use the other kind of record. By the use of my invention either kind of record can be played or used on the one machine without any foreign or disturbing noises being perceptible.

My invention comprises two tracker devices one to be used on a record having the laterally arranged indentations and one to be used on a record having the shallow and deep indentations, both of said devices being properly connected to the diaphragm of the machine to vibrate the same when tracking over a record. Of course the one device has the tracker needle in proper position to vibrate the diaphragm when tracking over a record having the laterally or zig-zag arranged indentations and the other device a point in proper position to vibrate the diaphragm when tracking over a record having the shallow and deep indentations.

Figure 1:
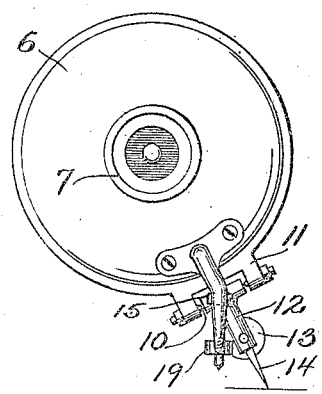
Figure 2:
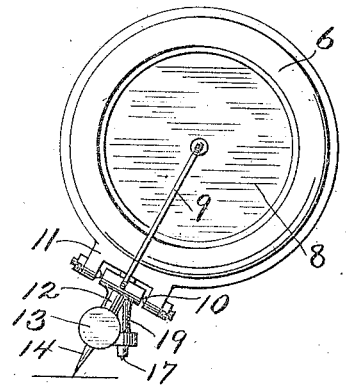
Figure 3:
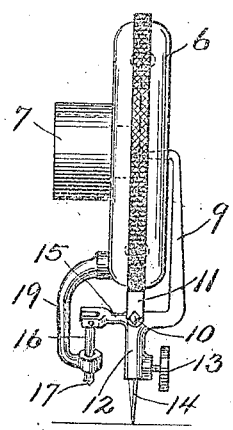
Figure 4:
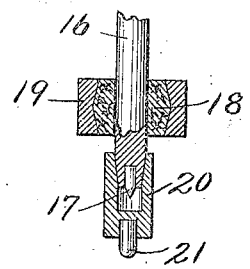

To describe my invention so that others versed in the art to which it pertains can make and use the same I have illustrated it on the accompanying sheet of drawing forming a part of this specification, in which:

Figure 1, is a view of one side of a sound box having tracker devices embodying my invention connected thereto; Fig. 2, is a view of the opposite side of the same sound box; Fig. 3, is an edge view of the same showing the construction of the two tracker devices, and Fig. 4, is a detail sectional view showing the guide for the tracker point rod and also means for attaching a different point to the rod.

Similar reference characters refer to similar parts throughout the several views.

In the drawings I have not attempted to show an entire machine, but only the sound box 6, with the two tracker devices connected thereto. The sound box 6 is connected to the horn in the usual way by means of the slip or threaded joint 7. The diaphragm 8 is secured in the box in any of the well known manners and has secured to its center, one end of the vibrator arm 9 in the usual way, and said arm 9 extends radially outward beyond the limits of the box 6 where it is pivotally mounted at 10 to a suitable bracket 11 secured rigidly to the box 6. The pivot 10 is arranged in such position that the vibrator arm 9 is free to move with the center of the diaphragm when the same is vibrated.

The vibrator arm 9 has an extension 12 on the opposite side of the pivot 10 from the diaphragm, which is provided with a needle socket and a set-screw 13 to hold the tracker needle 14, which I shall designate as the lateral motion needle because it is employed in connection with a record having the zig-zag indentations which cause the needle to move laterally as it tracks over the same.

The vibrator arm 9 is provided with a second extension or arm 15 which extends at right angles to the axis of pivot 10 and at right angles to the axis of the lateral motion needle 14. The free end of arm 15 is pivotally connected to one end of the tracker rod 16 provided with the point 17 which I shall designate as the longitudinal motion point because it is employed in connection with a record having the shallow and deep indentations which give the point a longitudinal movement when it tracks over the same. The remaining end of the tracker rod 16 is guided during its slight longitudinal movement by passing through a bushing 18 made of some soft material as cork or felt, to deaden any metallic or foreign sounds, which is securely mounted in the end of a bracket 19 rigidly secured to the box 6. The point 17 is made of sapphire or other suitable stone or metal. As clearly shown in Fig. 4, the longitudinal motion tracker rod 16 may be provided with a slightly tapering lower extremity onto which may be secured a tip 20 having a correspondingly tapering hole and provided with a rounded or dull point 21. The said point 21 is employed in connection with special records whose indentations are made to operate with a rounded or dull point.

From the description given it will be understood that when a record having zig-zag indentations is used in the machine a lateral motion needle 14 is secured in the extension 12, and when a record having shallow and deep indentations is used in the machine the lateral motion needle is removed so that the longitudinal motion point 17 of the tracker rod 16 is free to contact with the surface of the record.

Obviously when the lateral motion needle 14 is employed the vibrations will be transmitted from the record through the needle 14, extension 12, vibrator arm 9 and thence to diaphragm 8; and when the longitudinal motion point 17 is employed the vibrations will be transmitted from the record through tracker rod 16, extension or arm 15, vibrator arm 9 and thence to the diaphragm 8. Thus it is clear that the vibrations will be transmitted to the diaphragm 8 if either of the tracker devices is employed.

It will be understood that the material size and arrangement and construction of the parts may be modified without in the least departing from the scope of my invention.

Having thus fully described my invention what I claim as new and desire to secure by Letters Patent of the United States is:—

1. In a device of the class described, a diaphragm, a vibrator arm having one end connected to said diaphragm, means whereby a lateral motion tracker needle is operatively connected to said vibrator arm, means whereby a tracker rod carrying a longitudinal motion tracker point is pivotally connected at one end to an extension on the vibrator arm and means comprising a bearing provided with sound insulating material for guiding the free end of said tracker rod.

2. In a device of the class described, a tracker rod provided at one end with a tracker point and arranged to move longitudinally when vibrated, a bearing for one end of said tracker rod lined with sound insulating material, and a pivoted angular bar pivotally connected to the other end of said tracker rod.

In testimony whereof I have signed my name to this specification in presence of a subscribing witness this 25th day of January, 1915, at Chicago, Illinois.

MARTIN NYSTROM.

Witness:
  RICH'D J. JACKER.